United States Patent [19]

Iida et al.

[11] Patent Number: 5,007,709
[45] Date of Patent: Apr. 16, 1991

[54] DIFFRACTION GRATING AND MANUFACTURING METHOD THEREOF

[75] Inventors: Masanori Iida, Nara; Kiyokazu Hagiwara, Hirakata; Hiroyuki Asakura, Osaka; Minoru Nishioka, Kobe; Koichi Murase, Neyagawa, all of Japan

[73] Assignee: Matsushita Electric Industrial Co., Ltd., Osaka, Japan

[21] Appl. No.: 290,196

[22] Filed: Dec. 17, 1988

[30] Foreign Application Priority Data

Dec. 28, 1987 [JP] Japan .................. 62-331972
Dec. 28, 1987 [JP] Japan .................. 62-331978

[51] Int. Cl.$^5$ .................................. G02B 5/18
[52] U.S. Cl. ................... 350/162.22; 350/162.23; 350/162.2
[58] Field of Search ........... 350/162.17, 162.2, 96.19, 350/3.7, 162.22, 162.23

[56] References Cited

U.S. PATENT DOCUMENTS 4,148,549 4/1979 Termanis ..................... 350/3.70
4,402,571 9/1983 Cowan et al. .............. 350/162.17

OTHER PUBLICATIONS

Bliek et al, "Microwave Verification of a Numerical Optimization of Fourier Gratings", Appl. Phys. 24, pp. 147-150 (81).

*Primary Examiner*—Bruce Y. Arnold
*Assistant Examiner*—J. P. Ryan
*Attorney, Agent, or Firm*—Wenderoth, Lind & Ponack

[57] ABSTRACT

A diffraction grating has a reflection film formed on a photosensitive layer disposed on a substrate through exposure followed by development and the groove profile thus formed has a configuration distorted from a sinusoidal form because the sensitivity curve of the photosensitive layer is of the second order non-linearity to the exposure amount. With the groove pitch expressed by d, $K = 2\pi/d$, the coordinate perpendicular to the groove direction taken as x, and the groove profile $\eta(x)$ expressed as $\eta(x) = h[\sin(Kx) + \gamma \sin(2Kz - 90°)]$, the parameters h, $\gamma$ and $\phi$ satisfy as follows:

$$0.26 \leq 2h/d \leq 0.52$$

$$0.05 \leq \gamma \leq 0.32.$$

The wavelength region to be used is normalized by the groove pitch d as $0.67 \leq \lambda/d \leq 1.15$. When an incident angle is expressed by $\theta$ and the first order Littrow angle is expressed by $\theta_L$, the mount to be used is carried out in such a region that satisfies the following expression:

$$\theta_L - 5° \leq \theta \leq \theta_L + 5°.$$

6 Claims, 7 Drawing Sheets

FIG. 2

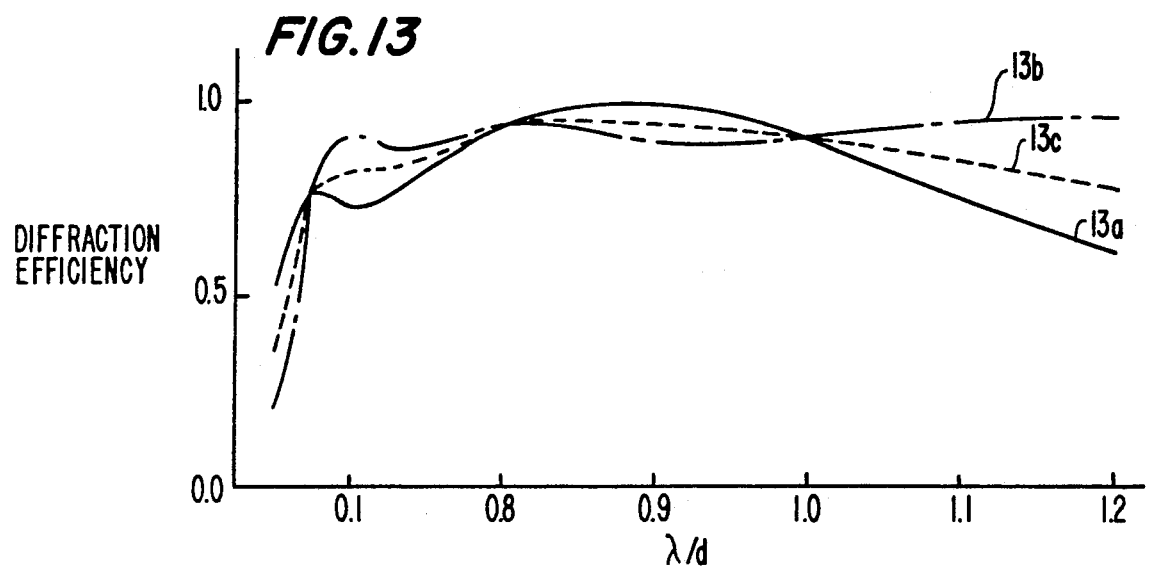
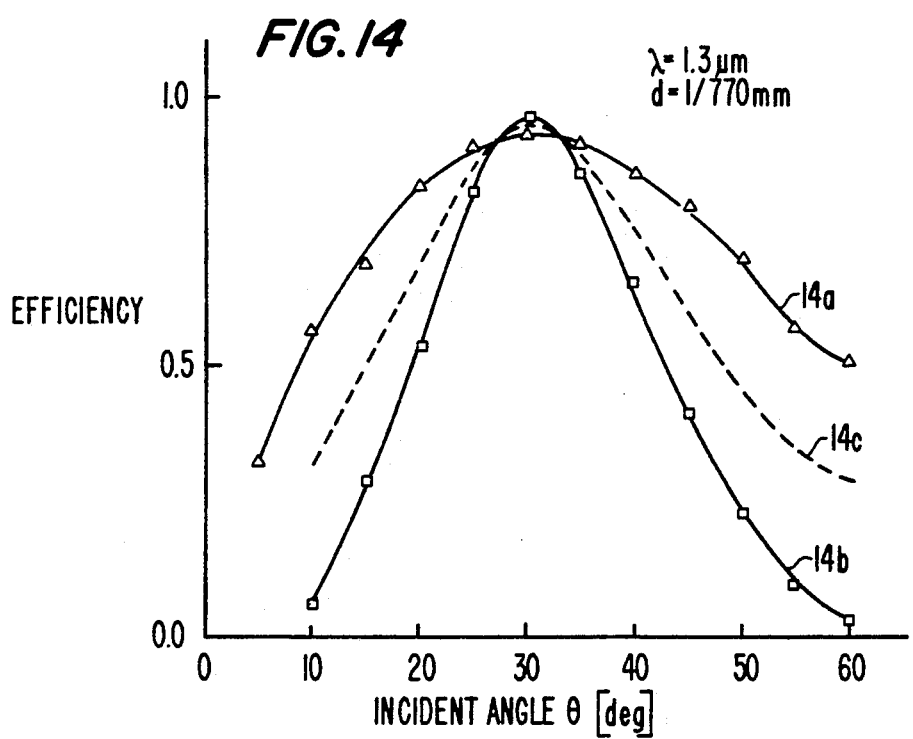

DIFFRACTION GRATING AND MANUFACTURING METHOD THEREOF

BACKGROUND OF THE INVENTION

1. Field of the Invention

This invention relates to a diffraction grating for use in a spectroscopic instrument, optical communication instrument or the like and a method of manufacturing the same.

2. Description of the Prior Art

Diffraction gratings have been mainly used in optical measuring instrument as a wavelength dispersion element for selectively extracting a preferable wavelength from a certain waveform region. However, in general, the diffraction grating has a diffraction efficiency, which is largely affected by the wavelength, incident angle and polarization of the incident light. However, if conditions of use are limited, it is possible to optimize the sectional profile of the grating to obtain a high performance diffraction grating. At present, research is being conducted in this area.

For example, an article in Appl. Phys. 24, No. 2 pp. 147-150 (1981) shows an experimental verification in the microwave region, of the idea that based on the fact that the manufacture of Fourior gratings by composing their groove profile is possible by combining a fundamental harmonic and the second order harmonic through the holographic exposure technology, the efficiency of Fourior gratings can be made higher than that of Echelette gratings for large wavelength region applications by locally optimizing the groove profile of the grating, in the microwave region.

Here, the Fourior gratings generally have a groove profile $\eta(x)$ which can be expressed, with the direction perpendicular to the groove direction taken as the x-axis and the groove pitch expressed as d, in terms of the fundamental harmonic K and the second order harmonic 2 K, where $K=2\pi/d$, as follows:

$$\eta(x)=h[\sin(Kx)+\gamma\sin(2Kx+\phi)]$$

where h, $\gamma$ and $\phi$ are parameters for determining the profile. The groove profile of diffraction gratings described in the above-mentioned article corresponds to the case when $h=0.42$, $\gamma=0.286$ and $\phi=-90°$.

In the article mentioned above, however, the local optimization is made under the condition that the angular deviation between the light incident to the diffraction grating and the first order diffracted light reflected therefrom is 17°. This means that, for example, light is incident thereto at $\lambda d=1$ from an angle different by 8.5° from the Littrow angle.

When diffraction gratings are employed for optical communication applications, they are used in the neighborhood of the Littrow mount in many cases, and there is no case in which they are used while maintaining an angular deviation of 17°. Therefore, the superiority of the Fourior gratings in the local optimization for the Littrow mount is not described quantitatively in the above-mentioned article. This is the first problem to be pointed out. Also, although a theoretical prediction has been verified experimentally in the microwave region, the groove profile of diffraction gratings actually experimented with is considerably different from that which is locally optimized.

In general, optical communication uses a light having a wavelength range from 0.8 $\mu$m to 1.55 $\mu$m which is considerably shorter than that of the microwave range. As a result, it cannot be concluded that the superiority of a diffraction grating locally optimized could be verified for all wavelength regions by having it verified only in the microwave range. This is the second problem to be pointed out.

In addition, the groove profile obtained by the calculation in the above-mentioned article is only appropriate for a perfectly conductive groove surface. Therefore, the theoretically calculated profile is not valid for a groove surface which is an imperfect conductor.

As to polarization, an article in J. Opt. Soc. Am. A, 3, No. 11 pp. 1780-1787 j(1986) describes that if the light waves polarized perpendicular and parallel to the groove direction, indicated as a TM wave and a TE wave, respectively, the groove profile is rectangular, but due to the conductivity that a metal of the surface of the diffraction grating has, variation of the efficiency of the TM wave due to the incident angle of a light is more rapid than that of the TE wave particularly in a wavelength range of several micro or less meters as compared to the situation where the reflecting surface is perfectly conductive. This is the third problem to be pointed out.

The conventional manufacturing method used in the two-beam interference exposure method, using a coherent light, but the photosensitive characteristic of a photosensitive layer to be formed on a substrate is produced in the range in which the film thickness residue of the photosensitive layer after development is approximately linearly related with the exposure time, so that in actually making Fourior gratings, for example, as in Optica Acta 26, No. 11, pp. 1427-1441 (1979), two exposure processes and precision positioning control are required.

In addition, in the holographic exposure technology, it is the general practice to expose an interference pattern obtained by superimposing plane waves with respect. In this case, however, since the coherent light from a spacial filter is a divergent beam, the spacial coherence will be disturbed by optical elements such as, for example, lenses and mirrors which are disposed between the substrate and the spacial filter in order to change a divergent wave into a plane wave, causing a slight distortion of the interference pattern. To avoid such a problem, a complicated optical system is required.

SUMMARY OF THE INVENTION

An object of this invention is to provide a diffraction grating which has a high diffraction efficiency in the Littrow mount and small dependency of the diffraction efficiency on the polarization direction, and a method of manufacturing the same using a simple manufacturing system.

In order to attain the above-mentioned objectives, a diffraction grating of this invention comprises: a substrate; a photosensitive layer formed on the photosensitive layer, in which where the direction perpendicular to the groove direction is indicated by the x-axis, the groove pitch is indicated by d, and $K=2\pi/d$, the groove profile $\eta(n)$ is given by:

$$\eta(x)=h[\sin(Kx)+\gamma\sin(2Kx-90°)]$$

The parameters h and $\gamma$ satisfy the following conditions:

$$0.05 \leq \gamma \leq 0.32$$

$$0.26 \leq 2h/d \leq 0.52.$$

The wavelength $\lambda$ is normalized with respect to the groove pitch d, and the normalized wavelength $\lambda/d$ is chosen so as to satisfy the following conditions:

When the incident angle to the diffraction grating and the first order Littrow angle are expressed by $\theta$ and $\theta L$, respectively, the following condition can be satisfied:

$$\theta L - 5° \leq \theta \leq \theta L + 5°$$

With the above described structure, diffraction efficiency for non-polarized light is at a level of 85% or more, so that the deviation of the diffraction efficiency caused by the polarization of incident light does not exceed 10%.

Preferably, $\gamma$, 2H/d and $\lambda/d$ satisfy the following conditions:

$$0.1 \leq \gamma \leq 0.25$$

$$0.35 \leq 2h/d \leq 0.45$$

$$0.70 \leq \gamma/d \leq 1.1$$

For manufacturing the diffraction grating, a photosensitive layer formed on a substrate is subject to interference exposure followed by development. The photosensitive layer has a characteristic represented by a characteristic curve of the exposure amount versus the film thickness residue of the photosensitive layer after development. The characteristic curve has a region in which the value of the second order differential of the curve is positive and the curve has no third order inflection point. When the exposure intensity distribution is given by I(x), and the second and first coefficients of the photosensitive curve in the region to be exposed obtained by approximating it to a quadratic curve are respectively expressed by a and b, the following relations can be satisfied, with the exposure intensity distribution I(x) expressed as $I(x) = I_0 + I_1 \sin(Kx)$:

$$2h/d = I_1 |b + 2aI_0|$$

and $$\gamma = aI_1/2 |b + 2aI_0|$$

Preferably, for example, in using a positive type photoresist, the following relation can be satisfied:

$$I_0 + I_1 < |b/2a|.$$

In using a negative type one, the following can be satisfied:

$$I_0 + I_1 > |b/2a|$$

wherein $b < 0$.

In addition, in using the two-beam interference exposure method; a system for producing a diffraction grating of this invention comprises an exposing laser, a half-mirror for dividing beam from an exposing laser into two beams, two sets of mirrors for reflecting the beam of each of two beams thereby to cause them to interfere on a photosensitive layer, and two sets of spacial filters each comprising a pinhole and a lens for improving the spacial coherence of the laser beams reflected from the mirrors and for making the beams reflected therefrom, a divergent beam. When the distance between the pinholes of the spacial filters, the distance between the middle point of the space between the pinholes and the substrate to be exposed, and the diameter or the length of longer side of the substrate to be exposed are expressed by C, H and L, respectively, the following relation is satisfied:

$$H \times C/L^2 \geq 32,$$

and the deviation between the highest and lowest values of the intensity that the envelope of exposure intensity distribution on the substrate to be exposed indicates is kept within 20%.

BRIEF DESCRIPTION OF THE DRAWINGS

FIG. 13 is a graph of the diffraction efficiency versus the value of $\gamma/d$ in the Littrow mount calculated when $\gamma = 0.2$ and 2 h/d = 0.435;

FIG. 14 is a graph of the dependence of the diffraction efficiency of a diffraction grating measured under the conditions $\gamma = 0.2$, $\lambda/d = 1.0$ and 2 h/d = 0.435 of the incident angle of a light beam;

DESCRIPTION OF THE PREFERRED EMBODIMENTS

Figure 1:
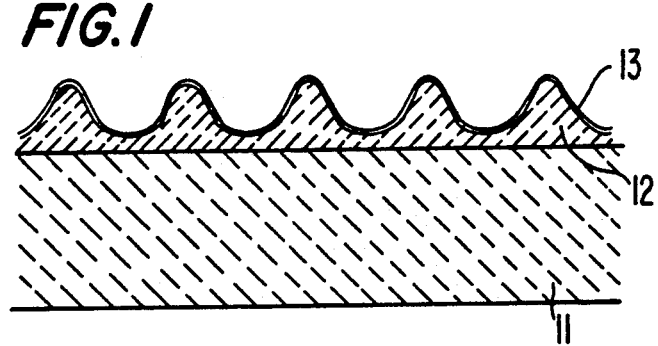
FIG. 1 is a cross-sectional view of a diffraction grating of this invention.

In FIG. 1, the reference numerals 11, 12 and 13 designate a substrate, a photosensitive layer and a reflection film, respectively.

On the substrate 11 is disposed the photosensitive layer 12 in which periodic grooves are patterned, using a holographic exposure. Then, the reflection film 13 is formed thereon having a thinness to a degree such that the groove profile patterned in the photosensitive layer 12 is not damaged, thereby a diffraction grating is constructed.

Figure 2:
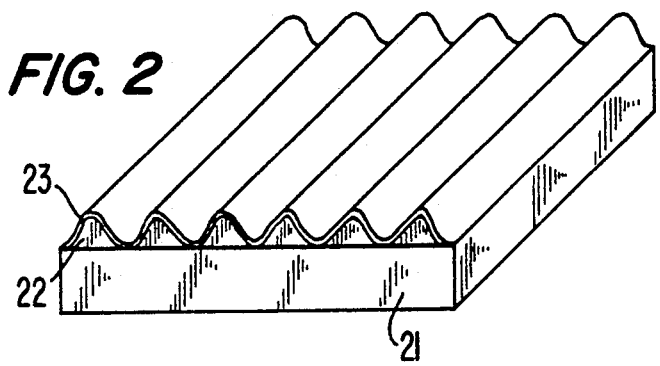
FIG. 2 is the perspective view of a diffraction grating shown in FIG. 1.

FIG. 2 is a perspective view of the diffraction grating shown in FIG. 1. The reference numerals 21, 22 and 23 indicate a substrate, a photosensitive layer and a reflection film, respectively. The substrate shown in this figure is plane and rectangular, but the shape thereof is not limited to this.

Intensity distribution of a light to be directed onto the photosensitive layer through the holographic technology is generally expressed in a trigonometricaly functional form in case of the two-beam interference light. If this is directly transferred to a photosensitive layer, it will become a sinusoidal form, so that by giving a nonlinearity to the photosensitive characteristic of the photosensitive layer, the groove profile after development can be made so that it will be distorted from the sinusoidal form.

Figure 3:
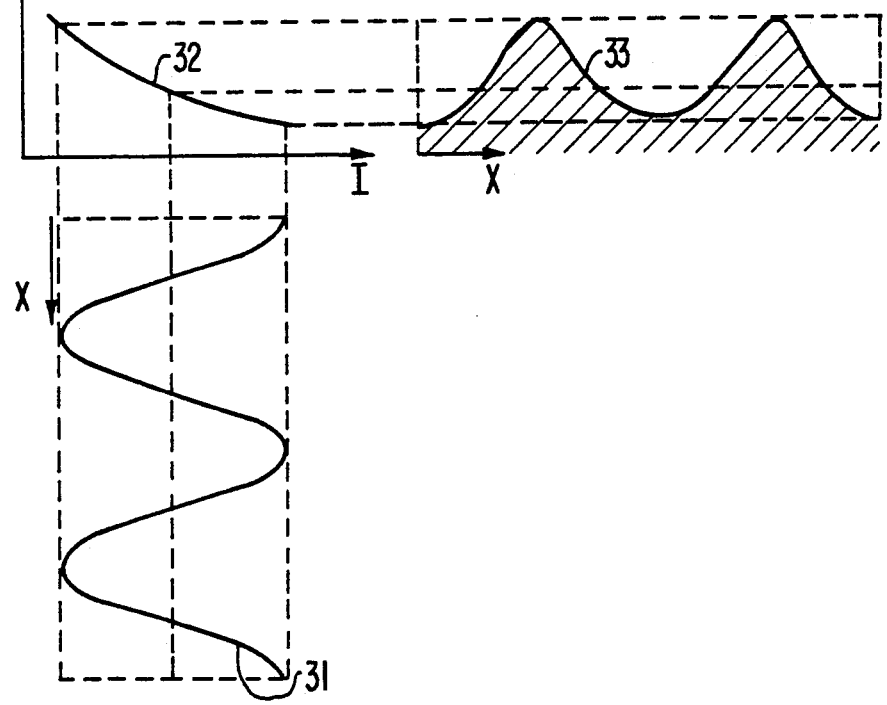
FIG. 3 is a photosensitive curve of a positive type photosensitive layer and a schematic drawing showing the groove profile of a diffraction grating formed thereby.

In FIG. 3, the reference numerals 31, 32 and 33 indicate an intensity distribution of an exposure light, a photosensitive curve of a positive type photosensitive layer, i.e., photosensitive a layer the exposed of which is removed after development, and a groove profile obtained after development, respectively. This figure shows one embodiment for making such conditions as $\gamma=0.2$ and $2h/d=0.435$ realizable in Fourior gratings, in which, with the intensity distribution of a light to be exposed expressed as $I(x)=I_0+I_1 \sin(KX)$ the following conditions are obtained:

$I_0=2.32$ mJ, $I_1=1.74$ mJ and $d=0.348$ μm.

In addition, with the curve obtained by approximating the photosensitive curve showing the film thickness residue $l/l_0$ in the exposed area of the photosensitive layer to a quadratic function expressed as $l/l_0 = aI^2 + bI + c$, the following conditions are obtained:

$a=0.1$, $b=-0.899$ and $c=0.25$.

If the area of the photosensitive layer to e exposed can be approximated to a quadratic curve, then there exists no inflection point of the third order. The intensity distribution 31 of an interference light is expressed in the trigonometrically functional form and the photosensitive curve 32 has a characteristic such that the second order differential coefficient is always positive in the area to be exposed. As a result, the change in the film thickness residue of the photosensitive layer in the area to be exposed is decreased with an increase in exposure amount. Thus, if the exposure is carried out under the condition of the, intensity distribution 31, then the groove profile 33 after development will have a profile which is distorted from a sinusoidal form in that the top portion of the groove is narrowed and the root portion thereof is made round. And a diffraction grating can be constructed by forming a thin reflection film which has such a degree of thinness that it will not damage the groove profile on the photosensitive layer. The above described embodiment has a positive type photoresist, but it is easily understood that if a negative type one, a photoresist in which the unexposed area of a photosensitive layer is removed after development, is used, the same result is obtainable. Thus, the above-exemplified numerical values are not limited to them.

Figure 4:
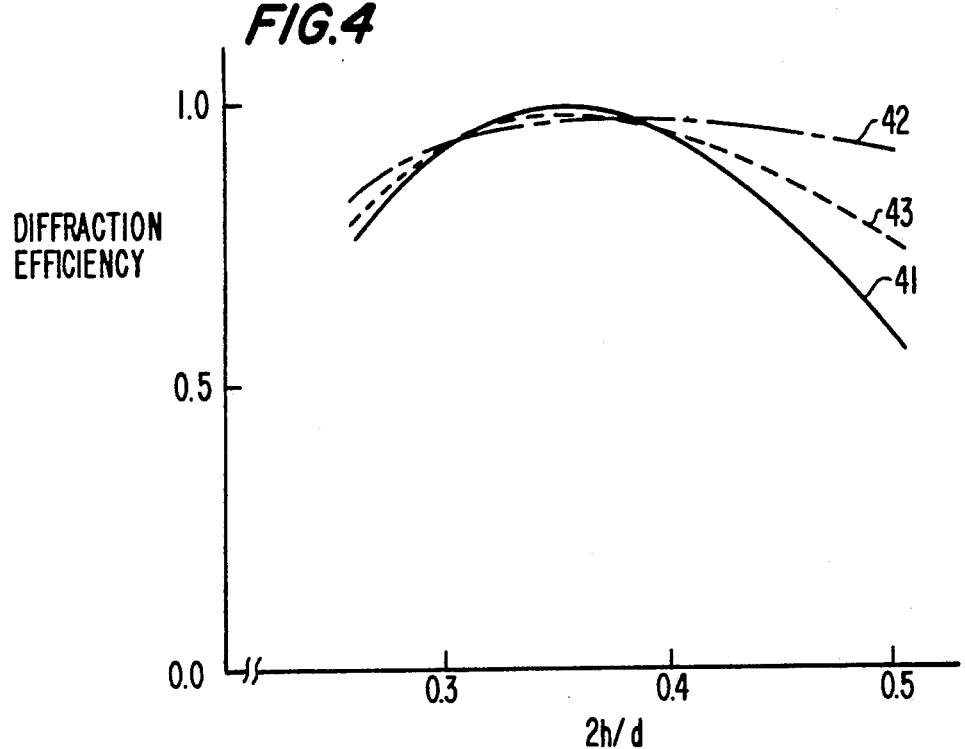
FIG. 4 is a graph of the diffraction efficiency versus the value of 2 h/d in the Littrow mount calculated when $\gamma = 0.05$, and $\lambda/d = 0.7$.

In FIG. 4, conditions such as $\gamma=0.05$ and $\lambda/d=0.7$ are used. A curve 41 shown by the continuous line indicates the diffraction efficiency for the TE wave, and a curve 42 shown by the alternate long and short dash line indicates the diffraction efficiency for the TM wave. A curve 43 shown by the short dashes line indicates the diffraction efficiency obtained when an incident light is non-polarized. The diffraction grating is constructed through numerical procedures described in J. Opt. Soc. Am. A 4, pp. 465-472 (1987) under the Littrow mount condition and the surface thereof is made perfectly conductive. The region in which the diffraction efficiency 43 when the incident light is non-polarized exceeds 85% is as follows:

$0.26 \leq 2h/d \leq 0.46$.

As to the deviation of the diffraction efficiency due to the polarization, particularly when $0.26 \leq 2h/d \leq 0.44$, it is kept within 10%, which means that the dependence of diffraction efficiency on polarization is small.

Figure 5:
FIG. 5 shows a groove profile when $\gamma = 0.05$, and 2 h/d = 0.383.

FIG. 5 shows the groove profile of the diffraction grating for which the numerical calculations were carried out. This is slightly distorted from the sinusoidal groove profile by an amount at which the second order harmonic is added.

Figure 6:
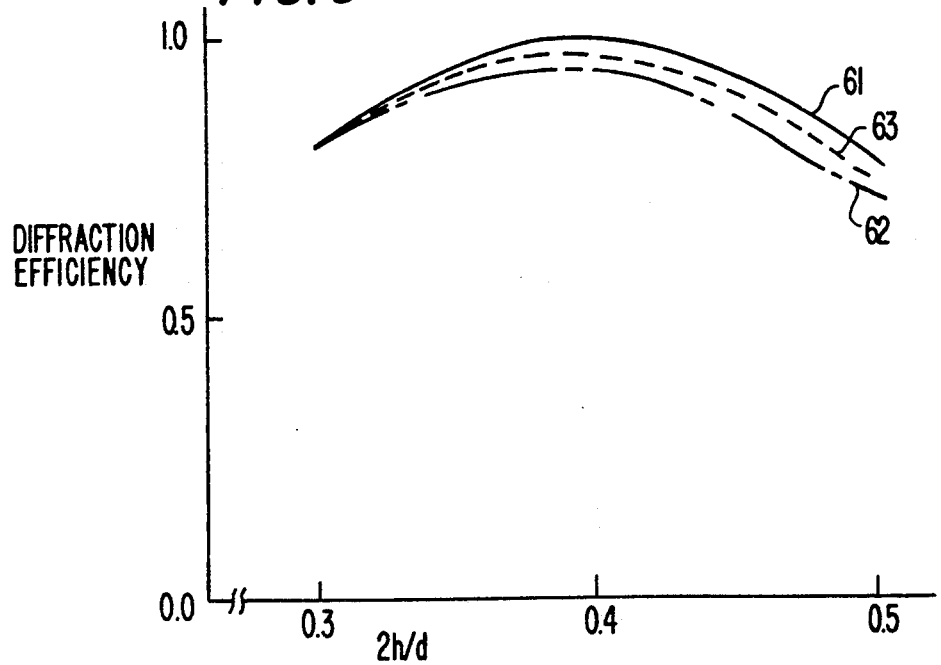
FIG. 6 is a graph of diffraction efficiency versus value of 2 h/d in the Littrow mount calculated when $\gamma = 0.32$ and $\lambda/d = 0.9$.

In FIG. 6, conditions such as $\gamma=0.32$ and $\lambda/d=0.9$ are used. The region in which a diffraction efficiency 63 for non-polarized light exceeds 85% is as follows:

$0.31 \leq bh/d \leq 0.46$.

In this region, the deviation of the diffraction efficiency due to the polarization is kept within 8%.

Figure 7:
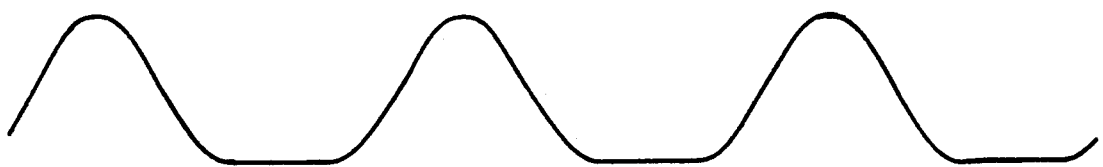
FIG. 7 shows the groove profile when $\gamma = 0.32$ and 2 h/d = 0.40.

FIG. 7 shows the groove profile of the diffraction grating for which the numerical calculations were carried out. As the distortion from the sinusoidal form is increased, the region in which the diffraction efficiency is high is shifted in the direction that the value of $2h/d$ is increased.

Figure 8:
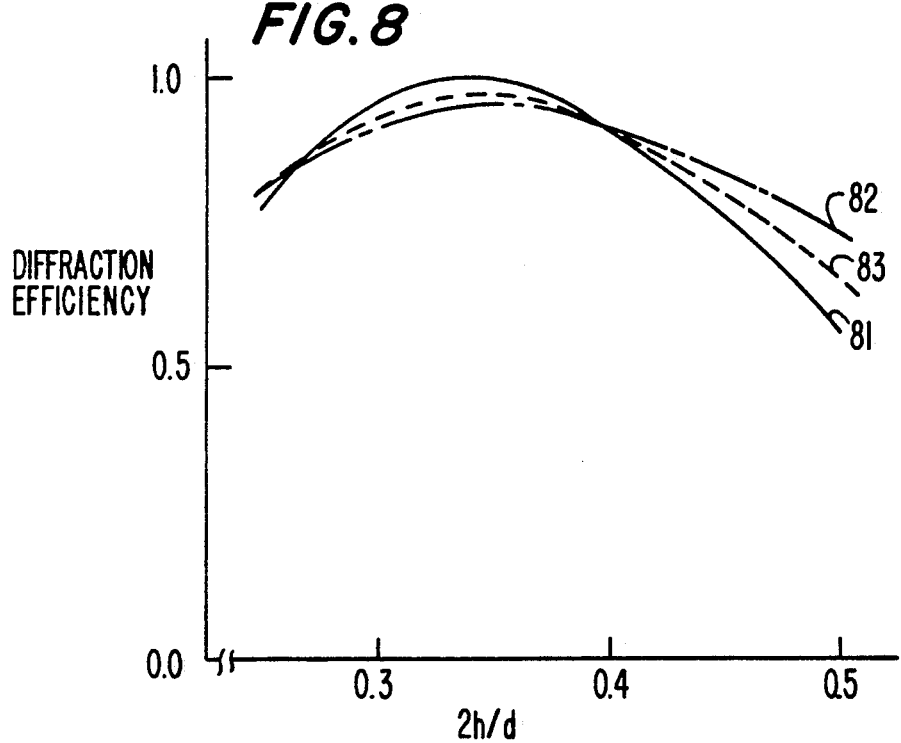
FIG. 8 is a graph of the diffraction efficiency versus the value of 2 h/d in the Littrow mount calculated when $\gamma = 0.1$ and $\lambda/d = 0.67$.

FIG. 8 shows the case that conditions such as $\gamma=0.1$ and $\lambda/d=0.67$ are used. The region in which a diffraction efficiency 83 for non-polarized light exceeds 85% is as follows:

$0.26 \leq 2h/d \leq 0.43$.

Figure 9:
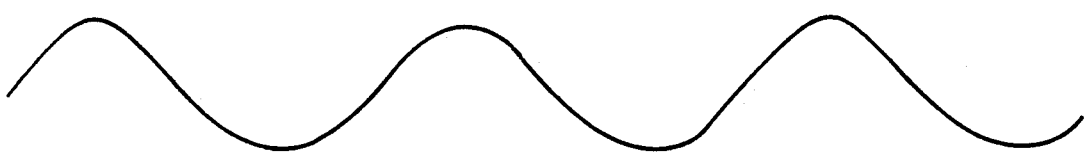
FIG. 9 shows the groove profile when $\gamma = 0.1$ and 2 h/d = 0.35.

In this region, the deviation of the diffraction efficiency due to the polarization is kept within 5%, which means that its dependence on polarization is particularly small. FIG. 9 shows the groove profile of the diffraction grating for which the numerical calculations were carried out.

Figure 10:
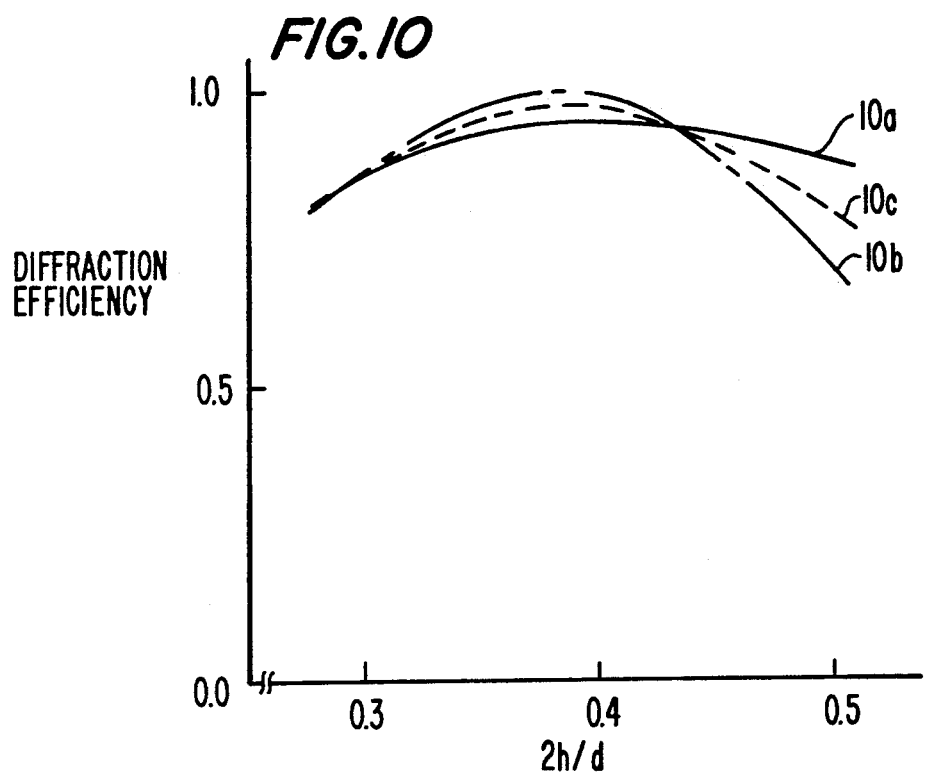
FIG. 10 is a graph of the diffraction efficiency versus the value of 2 h/d in the Littrow mount calculated when $\gamma = 0.2$ and $\lambda/d = 0.8$.

FIG. 10 shows the case that conditions such as $\gamma=0.2$ and $\lambda/d=0.8$ are used. The region in which a diffraction efficiency 10c for non-polarized light exceeds 85% is as follows:

$0.29 \leq 2h/d \leq 0.48$.

This means that a considerably wide region of 2 h/d is maintained. In this region, the deviation of the diffraction efficiency due to the polarization is kept within 10%.

Figure 11:
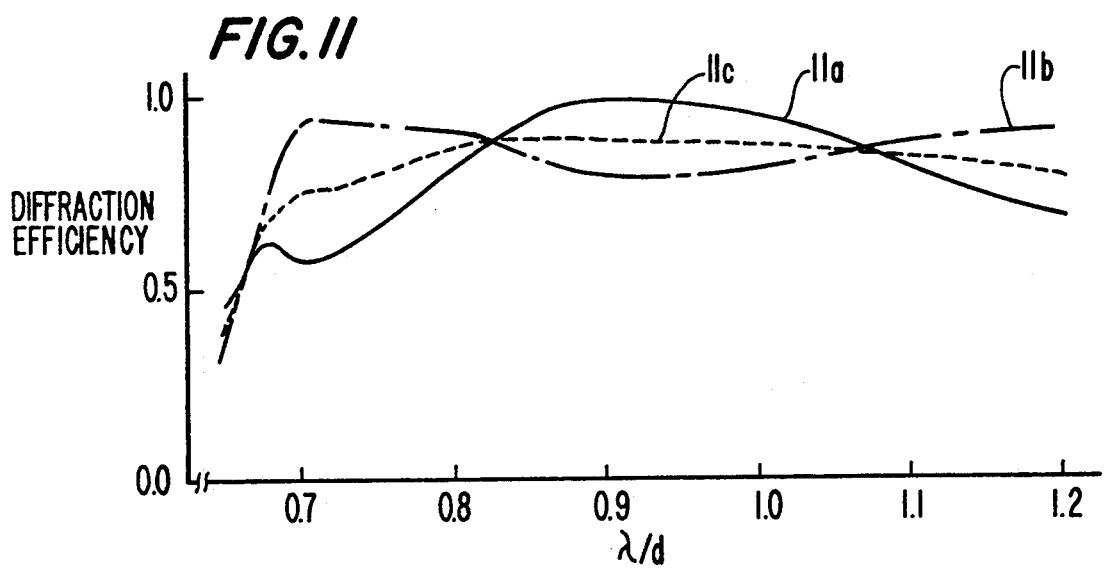
FIG. 11 is a graph of the diffraction efficiency versus the value of $\lambda/d$ in the Littrow mount calculated when $\gamma = 0.2$ and 2 h/d = 0.47.

FIG. 11 is a graph showing the dependence of diffraction efficiency on wavelength when 2 h/d=0.47 is taken in FIG. 10. The region in which a diffraction efficiency 11c for non-polarized light exceeds 85% is as follows:

$$0.78 \leq \lambda/d \leq 1.15.$$

Figure 12:
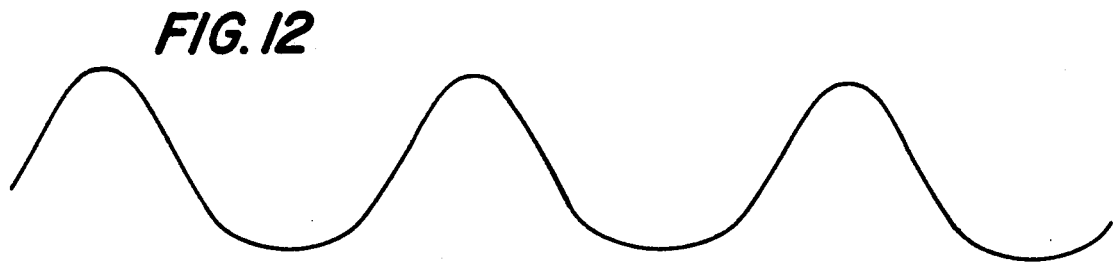
FIG. 12 shows the groove profile when $\gamma = 0.2$ and 2 h/d = 0.47.

However, in the region of $0.88 < \lambda/d < 1.0$, the deviations of diffraction efficiencies for light of both polarizations become large. FIG. 12 shows the groove profile of the diffraction grating for which the numerical calculations were carried out.

FIG. 13 is a graph showing the dependence of diffraction efficiency on wavelength when 2 h/d=0.435 where the diffraction efficiencies for light of both polarizations are equal to each other in FIG. 10 is taken. The region in which a diffraction efficiency 13c for non-polarized light exceeds 85% is as follows:

$0.70 \leq \lambda/d \leq 1.15$. Particularly, in a wide region of wavelengths satisfying such a condition as $0.73 \leq \lambda/d \leq 1.07$, the deviation of the diffraction. efficiency due to the polarization is kept within 10%.

FIG. 14 shows the dependence of diffraction efficiency on incident angle resulting from measurements using a diffraction grating actually produced by forming a photosensitive layer on a glass substrate and then applying the holographic exposure thereto. The groove pitch (distance between adjacent two grooves) is 1.3 μm, and on the surface thereof is evaporated gold whose reflectivity exceeds 99%, and a semiconductor laser of a 1.3 μm band was used as a test light.

In FIG. 14, an incident angle of 30° corresponds to the Littrow angle. The curve 14a is for the diffraction efficiency of the TE wave, the curve 14b for the diffraction efficiency of the TM wave, and the curve 14c for that of non-polarized light. Marks △ and □ show points measured for the TE wave 14a and the TM wave 14b, respectively. Generally, under such a condition as λ/d=1, the diffraction efficiency is increased in the first order Littrow mount, and it is decreased as the incident angle moves farther apart from the Littrow angle. As seen in FIG. 14, for light of both polarizations, the maximum value of diffraction efficiency is obtained at the Littrow-mount and a diffraction efficiency as high as 95% is obtained for non-polarized light. The diffraction efficiencies at that time are approximately identical to calculated values in FIG. 13. As is clear from FIG. 14, the diffraction efficiency for an incident angle in a range of 5° from the Littrow angle maintains 85% or more for non-polarized light, and the efficiency deviation due to polarization is sufficiently small to be within 10%. In case that an incident angle is apart 5° from the Littrow angle, the angular deviation between the incident angle and the reflection angle of the first order diffracted light corresponds to 10°.

Further as clear from FIG. 14, if a light is incident from an angle greater than this, the diffraction efficiency 14b of the TM wave is rapidly decreased due to the permittivity of the surface of diffraction grating as compared with the diffraction efficiency 14a of the TE wave. For example, when a light is incident from an angle 10° from the Littrow angle, the deviation of diffraction efficiency between both polarizations exceeds 20%, so that the diffraction efficiency 14c for non-polarized light will become low.

Figure 15:
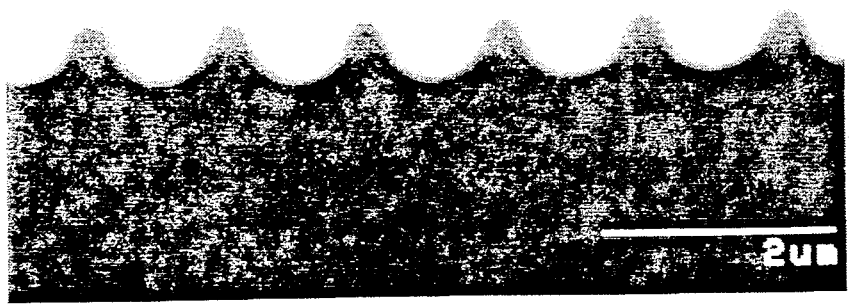
FIG. 15 is a scanning electron microscopic (SEM) observation of the diffraction grating to be measured.

In FIG. 15, the groove profile of the diffraction grating used for measurement is observed by using SEM (Scanning Electron Microscopy). In this case, the groove profile has a profile corresponding to conditions such as γ=0.2, λ/d=1.0 and 2 h/d=0.435. In addition, various profiles can be provided by changing the combination of parameters 2 h/d, γ and λ/d. As a result, the invention is not limited to the above-mentioned embodiments.

Figure 16:
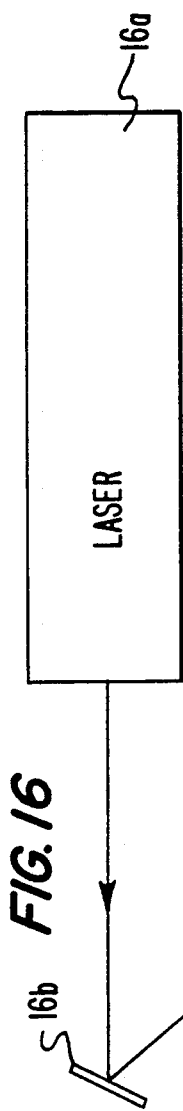
FIG. 16 is a schematic diagram illustrating an embodiment of a manufacturing method of the diffraction grating shown in FIG. 1.

In FIG. 16, an exposing laser is indicated at 16a, mirrors are indicated at 16b, 16c and 16d, a beam splitter at 16e, spacial filters consisting of a lens and pinhole at 16f and 16g, a photosensitive layer at 16h and a substrate at 16i. The mirrors 16c and 16d are disposed so that the beams divided into two will interfere with each other on the photosensitive layer 16h of the substrate 16i.

A coherent light sent from the exposing laser 16a is reflected by the mirror 16b and then divided into two beams through the beam splitter 16e. The beams thus divided are respectively reflected by the mirrors 16c and 16d to go to the spacial filters 16f and 16g thereby to increase their spacial coherence and to become divergent waves, thus being superimposed to each other on the photosensitive layer 16h. It is described, for example, in E. Wolf, "Progress in Optics XIV", ch. V, pp. 205 (North-Holland 1976) that an interference pattern produced by superimposing divergent waves on each other generally is in the hyperbolic form.

Figure 17:
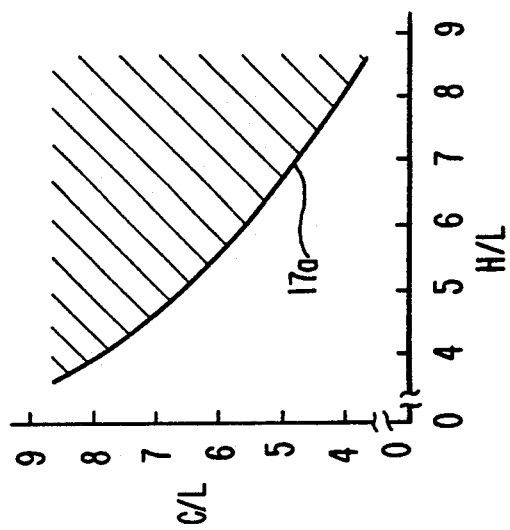
FIG. 17 is a graph showing the range that the deviation of the spacing of interference patterns exposed on the surface of a substrate is within 1%.

Referring to FIG. 17, when the distance between the pinholes of the spacial filters 16f and 16g is expressed by C, the distance between the middle point of the space between the pinholes and the photosensitive layer 16h is expressed by H, and the length of longer side of the substrate 16i is expressed by L, it is shown that the rate of the difference of the pattern interval between the interference patterns at the edge portion of the substrate 16i (d1) and the pattern interval between those at the center portion thereof (dθ), i.e., (d1−d0)/d0, does not exceed 1%. In FIG. 17, the ordinate and abscissa are C/L and H/L, respectively. A boundary line 17a indicates a curve where the ratio of difference becomes 1%, and the shaded area indicates the region where it is below 1%. The boundary line 17a satisfies the following condition:

$$C \times H/L^2 = 32$$

As a result, the interference pattern to be exposed under the condition of $C \times H/L^2 \geq 32$ can have the pattern interval kept within 1% on the surface of a substrate to be exposed by adopting only a part of the interference patterns of the hyperbolic form as shown in FIG. 16, so that the interference pattern can be regarded to be linear. Therefore, there is no need to use any optical instrument between the spacial filters and substrate. This means that the spacial coherence is improved and interference exposure can be achieved by using an optical system which is simple in structure.

In addition, since the envelope of the intensity distribution on the photosensitive layer 16h is of the Gaussian distribution, in order to obtain a uniform groove profile all over the substrate in performing the exposure for a constant period of time, it is required that the deviation of the intensity of the envelope of a light to be exposed all over the substrate be is kept within 20% at the central portion where it is highest and the edge portion where it is lowest. For example, when the deviation of exposure intensity of an actually produced diffraction granting is 20%, even when non-polarized, a diffraction efficiency of 80% or more can be obtained.

As an example of such structure, when settings such as L=30 mm, H=600 mm and C=400 mm, are used and an objective lens with a magnification of 40 is used in the spacial filter, the diameter of a beam to be interfered on the substrate is 140 mm, the deviation in the envelope of intensity distribution on the surface of the photosensitive layer to be exposed is kept within 10%, the value of $C \times H/L^2$ is 260, and the deviation between the interval of the interference patterns at the central and edge portions of the substrate is kept within 0.1%, which means that no problem arises practically.

Also, the mirror 16b shown in FIG. 16 can be omitted. No limitation is made to the above-described embodiments.

What is claimed is:

1. A diffraction grating for diffracting light incident thereupon, comprising:
   a substrate;
   a photosensitive layer formed on said substrate and having formed on a surface thereof a pattern of cyclic grooves; and
   a reflection film formed on said surface of said photosensitive layer,
   wherein said grating has a groove profile $\eta(x)$ given by:

$$\eta(x) = h[\sin(Kx) + \gamma \sin(2Kx - 90°)],$$

where a direction perpendicular to the groove is indicated by x-axis, a groove pitch is indicated by d, $K = 2\pi/d$, and parameters h and $\gamma$ satisfy the following conditions:

$$0.26 \leq 2h/d \leq 0.52$$

$$0.05 \leq \gamma \leq 0.32,$$

wherein when the wavelength $\lambda$ of the incident light is normalized with respect to the groove pitch d to a normalized wavelength $\lambda/d$, the normalized wavelength $\lambda/d$ satisfies the following condition:

$$0.67 \leq \lambda/d \leq 1.15,$$

and wherein said grating is used in a mount satisfying the following condition:

$$\Theta_L - 5° \leq \Theta \leq \Theta_L + 5°,$$

where $\Theta$ denotes the incident angle of the incident light and $\Theta_L$ denotes the first order Littrow angle.

2. A diffraction grating for diffracting light incident thereupon, comprising:
   a substrate;
   a photosensitive layer formed on said substrate and having formed on a surface thereof a pattern of cyclic grooves; and
   a reflection film formed on said surface of said photosensitive layer,
   wherein said grating has a groove profile $\eta(x)$ given by:

$$\eta(x) = h[\sin(Kx) + \gamma \sin(2Kx - 90°)],$$

where a direction perpendicular to the groove is indicated by x-axis, a groove pitch is indicated by d, $K = \pi/d$, and parameters h and $\gamma$ satisfy the following conditions:

$$0.35 \leq 2h/d \leq 0.45$$

$$0.10 \leq \gamma \leq 0.25,$$

wherein when the wavelength $\gamma$ of the incident light is normalized with respect to the groove pitch d to a normalized wavelength $\lambda/d$, the normalized wavelength $\lambda/d$ satisfies the following condition:

$$0.67 \leq \lambda/d \leq 1.15,$$

and wherein said grating is used in a mount satisfying the following condition:

$$\Theta_L - 5° \leq \Theta \leq \Theta_L + 5°,$$

where $\Theta$ denotes the first Littrow angle.

3. A method of manufacturing a diffraction grating, comprising the steps of:
   forming on a substrate a photosensitive layer having a photosensitive characteristic represented by a characteristic curve of an exposure amount versus a film thickness residue of said photosensitive layer after development, said characteristic curve having a region in which the value of the second order differential of said characteristic curve is positive and having no third order inflection point whereby said region can be approximated to a quadratic curve;
   subjecting said photosensitive layer to an interference exposure in said region of said characteristic curve; and
   developing the exposed photosensitive layer to thereby obtain a diffraction grating which has a groove profile $\eta(x)$, given by:

$$\eta(x) = h[\sin(Kx) + \gamma \sin(2Kx - 90°)],$$

where a direction perpendicular to the groove is indicated by x-axis, a groove pitch is indicated by d and $K = 2\pi/d$,
   wherein when an exposure intensity distribution $I(x)$ is expressed as $$I(x) = I_0 + I_1 \sin(Kx),$$

the following conditions are satisfied:

$$2h/d = I_1 |b + 2aI_0|$$

$$\gamma = aI_1/2 |b + 2aI_0|,$$

where a and b respectively denote coefficients of the first and second terms of a formula expressing said quadratic curve.

4. A method as claimed in claim 3, wherein said photosensitive layer is a positive type photoresist, and the following condition is satisfied;

$$I_0 + I_1 > |b/2a|.$$

5. A method as claimed in claim 3, wherein said photosensitive layer is a negative type photoresist, and the following conditions are satisfied:

$$b < 0$$

$I_0 + I_1 > |b/2a|$.

6. An apparatus for manufacturing a diffraction grating, comprising:
- a laser for producing a light;
- a half mirror for dividing the light from said laser into two beams;
- two mirrors for respectively reflecting the two beams in directions toward a photosensitive layer formed on a substrate which has a diameter of longitudinal length L; and
- two spacial filters each including a pinhole for respectively improving the spacial coherences of the reflected two beam from said two mirrors and for converting the reflected two beams to two divergent beams of light so that said photosensitive layer is interferentially exposed by the two divergent beams of light, said two spacial filters being spaced from each other by a distance C, and a middle point between the pinholes of said two spacial filters being spaced from said substrate by a distance H.

wherein L, C and H satisfy the following condition:

$H \times C/L^2 \geq 32$, and wherein a deviation of the exposure intensity distribution on said substrate is within 20%.

* * * * *